US012633548B2

(12) United States Patent
Bouazza

(10) Patent No.: US 12,633,548 B2
(45) Date of Patent: May 19, 2026

(54) ELIMINATING VOLTAGE DELAY AND STABILIZING IMPEDANCE BY ELECTROLYTE ADDITIVES IN ALKALI METAL ELECTROCHEMICAL CELLS

(71) Applicant: LITRONIK Batterietechnologie GmbH, Pirna (DE)

(72) Inventor: Sofiane Bouazza, Pirna (DE)

(73) Assignee: LITRONIK Batterietechnologie GmbH, Pirna (DE)

( * ) Notice: Subject to any disclaimer, the term of this patent is extended or adjusted under 35 U.S.C. 154(b) by 670 days.

(21) Appl. No.: 17/625,419

(22) PCT Filed: Jul. 1, 2020

(86) PCT No.: PCT/EP2020/068552
§ 371 (c)(1),
(2) Date: Jan. 7, 2022

(87) PCT Pub. No.: WO2021/004862
PCT Pub. Date: Jan. 14, 2021

(65) Prior Publication Data

US 2022/0263102 A1 Aug. 18, 2022

(30) Foreign Application Priority Data

Jul. 10, 2019 (EP) .................................... 19185488

(51) Int. Cl.
*H01M 4/133* (2010.01)
*H01M 4/38* (2006.01)
(Continued)

(52) U.S. Cl.
CPC ........... *H01M 6/168* (2013.01); *H01M 4/133* (2013.01); *H01M 4/382* (2013.01);
(Continued)

(58) Field of Classification Search
CPC ...... H01M 6/168; H01M 4/133; H01M 4/382; H01M 4/5835
See application file for complete search history.

(56) References Cited

U.S. PATENT DOCUMENTS 3,915,743 A * 10/1975 Lauck ............... H01M 10/0566 429/341
7,740,986 B2 6/2010 Yumoto et al.
(Continued)

FOREIGN PATENT DOCUMENTS

EP 1296401 A2 3/2003
JP 5463581 B2 4/2014

OTHER PUBLICATIONS

"Triphenylboroxine and triphenylborane as anion acceptors for electrolyte in fluoride shuttle batteries", Konishi et al., Chemistry Letters, 47 (11), 1346-1349. 2018.*
(Continued)

*Primary Examiner* — Kenneth J Douyette
(74) *Attorney, Agent, or Firm* — Buchanan Ingersol & Rooney PC

(57) ABSTRACT

The present invention relates to a primary cell, comprising an alkali metal as the active electrode material, in particular as the active anode material, and an electrolyte comprising a boron compound, wherein the boron compound is compound according to formula (1), (2), (3), (4), (7) or (8):
(Continued)

(1)

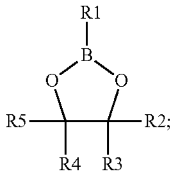

(2)

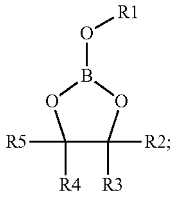

(3)

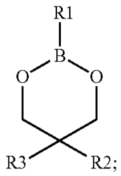

(4)

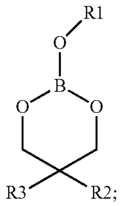

(7)

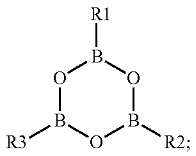

-continued (8)

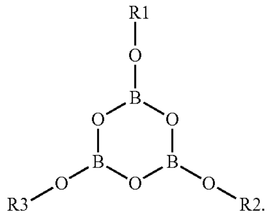

12 Claims, 5 Drawing Sheets

(51) Int. Cl.

| | |
|---|---|
| ***H01M 4/505*** | (2010.01) |
| ***H01M 4/583*** | (2010.01) |
| ***H01M 6/16*** | (2006.01) |
| *H01M 4/62* | (2006.01) |

(52) U.S. Cl.

CPC .......... *H01M 4/5835* (2013.01); *H01M 4/505* (2013.01); *H01M 4/623* (2013.01); *H01M 2300/0037* (2013.01)

(56) References Cited

U.S. PATENT DOCUMENTS

| | | | | |
|---|---|---|---|---|
| 2006/0210883 | A1 | 9/2006 | Chen et al. | |
| 2007/0077496 | A1* | 4/2007 | Scott ..................... | H01M 4/587 429/330 |
| 2007/0111099 | A1* | 5/2007 | Nanjundaswamy .... | H01M 6/16 429/231.95 |
| 2010/0279155 | A1 | 11/2010 | Scott et al. | |
| 2011/0076572 | A1* | 3/2011 | Amine .................. | H01M 10/05 429/328 |
| 2011/0183204 | A1* | 7/2011 | Jones .................... | H01M 4/622 429/217 |
| 2015/0037690 | A1 | 2/2015 | Dalavi et al. | |
| 2016/0226103 | A1* | 8/2016 | Teran ................ | H01M 10/0567 |

OTHER PUBLICATIONS

International Search Report (PCT/ISA/210) with translation and Written Opinion (PCT/ISA/237) mailed on Oct. 7, 2020, by the European Patent Office as the International Searching Authority for International Application No. PCT/EP2020/068552.

Nair, et al., "Fluorinated Boroxin-Based Anion Receptors for Lithium Ion Batteries: Fluoride Anion Binding. Ab Initio Calculations, and Ionic Conductivity Studies", Journal of Physical Chemistry, vol. 113, No. 20, May 2009, pp. 5918-5926.

* cited by examiner

ELIMINATING VOLTAGE DELAY AND STABILIZING IMPEDANCE BY ELECTROLYTE ADDITIVES IN ALKALI METAL ELECTROCHEMICAL CELLS

CROSS-REFERENCE TO RELATED APPLICATIONS

This application is the United States National Phase under 35 U.S.C. § 371 of PCT International Patent Application No. PCT/EP2020/068552, filed on Jul. 1, 2020, which claims the benefit of European Patent Application No. 19185488.4, filed on Jul. 10, 2019, the disclosures of which are hereby incorporated by reference herein in their entireties.

TECHNICAL FIELD

The present invention relates to boron-based electrolyte additives for a primary alkali metal electrochemical cell and to a corresponding primary alkali metal electrochemical cell.

BACKGROUND

A monotonic pulse shape is generally desirable in electrochemical cells. A monotonic pulse shape exists when the voltage curve remains constant under pulse conditions or decreases to the minimum at the end of the pulse, and the minimum voltage of the first pulse in a pulse series is higher than the minimum voltage of the last pulse. The voltage curve of this pulse series is usually rectangular (FIG. 1).

Voltage delay is an undesirable characteristic in the discharge profile of implantable alkali metal cells under current pulse discharge conditions. Voltage delay is caused by the formation of relatively high impedance cover layers on the anode surface, resulting in an increase in the internal resistance of the battery. This effect can only be observed when the batteries are subjected to high pulse current densities and, in the process, the battery voltage drops disproportionately, that is, the voltage at the beginning of the first pulse is lower than at the end of the pulse or when the first pulse is lower than the minimum voltage of the last pulse (FIG. 2).

Voltage delay normally first becomes apparent under pulse loading in alkali metal/metal oxide and alkali metal/mixed metal oxide cells at more than 40% DoD (depth of discharge) of their capacity discharge or after extended storage. In certain instances, a high impedance cover layer forms on the anode surface, for example due to dissolution of the cathode active material or due to discharge products in the battery electrolyte, which under certain pulse discharge conditions can result in voltage delay or in non-monotonic behavior.

Electrolyte additives such as phosphates, dicarbonates, nitrites, alkyl phosphates and organic additives including hydroxyl groups (—OH) and carboxyl groups for suppressing or reducing the voltage delay for alkali metal/transition metal oxide (such as Li/SVO) and alkali metal/mixed oxides x and/or transition metal oxide or for Li/SVO cells are known in the prior art.

The aforementioned additives are typically used for alkali metal/transition metal oxide systems, in particular for lithium/silver vanadium oxide (Li/SVO) and lithium/silver vanadium oxide hybrid cathodes (Li/SVO hybrid cathodes), in which increases in impedance and, consequently, voltage delay occur due to high impedance cover layers made of metal deposits such as vanadium, silver and/or metal alloys on the electrode surface. The aforementioned additives, however, are not suitable for alkali metal/carbon monofluoride (Li/CFx) systems, in which the voltage delay occurs due to fluoride lithium deposits on the anode surface.

Organoborate salts are also known in the prior art (for example from U.S. Pat. No. 7,740,986 B2) as an electrolyte conducting salt or an electrolyte additive for lowering self-discharge and for reducing/eliminating the voltage delay after storage at room and elevated temperatures of the Li/CFx cells. However, compared to the standard electrolyte, the organoborate-based electrolytes show increased battery resistance (see Example 01).

Based on this background, it is an objective of the present invention to provide an electrolyte additive for primary cells, especially containing lithium as the active electrode material, which reduces, and preferably eliminates, voltage delay and reduces battery impedance.

The present disclosure is directed toward overcoming one or more of the above-mentioned problems, though not necessarily limited to embodiments that do.

SUMMARY

At least the object is achieved by a primary cell having the features of claim 1 and by the use of a boron compound having the features of claim 9. Suitable embodiments are provided in the corresponding dependent claims and in the following description.

According to claim 1, a primary cell is provided, which comprises alkali metal as the active electrode material, particularly as the active anode material, and an electrolyte comprising a boron compound, in particular an organic boron compound.

The term "primary cell" is used in its generally known, technical meaning in the context of the present description. It denotes in particular a galvanic cell that, once discharged, can no longer be electrically charged. Primary cells are also referred to as primary battery at times.

The boron compound is in particular a non-ionic compound, that is, preferably not a salt of a boron-containing acid.

According to the present invention, it is particularly provided that the boron compound is a compound according to formula (1), (2), (3), (4), (7) or (8):

(1)

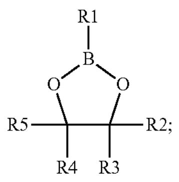

(2)

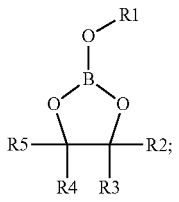

(3)

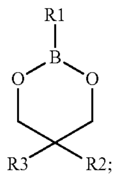

-continued (4)

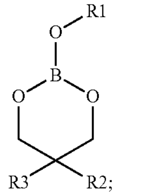

(7)

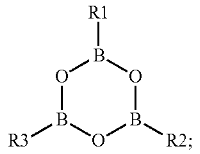

(8)

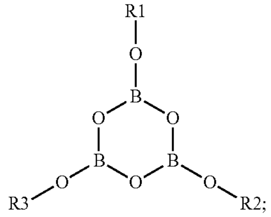

where R1, R2, R3, R4 and R5 independent from one another are selected from the group consisting of hydrogen, alkyl, alkenyl, cycloalkyl, thioether, heterocyclic compounds, aryl and heteroaryl, wherein R1, R2, R3, R4 or R5 is not thiophene.

In one embodiment of the primary cell according to the present invention, it is provided that R1, R2, R3, R4 and R5 independent from one another are unsubstituted or are monosubstituted or multiple substituted with at least one substituent selected from the group consisting of: alkyl, fluoroalkyl, alkoxy, carbonyl, carboxyl, thiol, thio alkoxide, aryl, ether, thioether, nitro, cyano, amino, azido, amidino, hydrazino, hydrazono, carbamoyl, sulfo, sulfamoyl, sulfonylamino, alkylaminosulfonyl, alkyl sulfonyl amino and/or halogen. Preferred substituents comprise halogens, fluoroalkyls and cyano or nitrile groups, wherein R1, R2, R3, R4 or R5 is not thiophene.

In one embodiment of the primary cell according to the present invention, it is provided that the boron compound is a compound according to formula (1), where R1 is an alkyl, in particular a $C_1$ to $C_6$ alkyl, in particular methyl, cyclopropyl or cyclohexyl, or an aryl, in particular a phenyl, a benzyl or a naphthyl, which is unsubstituted or substituted with one or more $C_1$ to $C_4$ alkyl, —F, —Cl, —Br, —I, —CN, —$CF_3$ or —$OCF_3$, and each of R2 to R4 and R5 independent from one another is a $C_1$ $C_4$ alkyl.

In one embodiment of the primary cell according to the present invention, it is provided that the compound according to formula (1) is:

4,4,5,5-tetramethyl-2-(3,4,5-trifluorophenyl)-1,3,2-dioxaborolane;
2-(bromomethyl)-4,4,5,5-tetramethyl-1,3,2-dioxaborolane;
2-cyclopropyl-4,4,5,5-tetramethyl-1,3,2-dioxaborolane;
2-cyclohexyl-4,4,5,5-tetramethyl-1,3,2-dioxaborolane;
4,4,5,5-tetramethyl-2-(naphthalene-1-ylmethyl)-1,3,2-dioxaborolane;
2-benzyl-4,4,5,5-tetramethyl-1,3,2-dioxaborolane;
2-phenyl-4,4,5,5-tetramethyl-1,3,2-dioxaborolane;
4,4,5,5-tetramethyl-2-(1-naphthyl)-1,3,2-dioxaborolane;
2-(4-chlorophenyl)-4,4,5,5-tetramethyl-1,3,2-dioxaborolane;

2-(4-fluorophenyl)-4,4,5,5-tetramethyl-1,3,2-dioxaborolane;
4,4,5,5-tetramethyl-2-(3,4,5-trifluorophenyl)-1,3,2-dioxaborolane;
2-(4-bromophenyl)-4,4,5,5-tetramethyl-1,3,2-dioxaborolane;
2-(3,5-dichlorophenyl)-4,4,5,5-tetramethyl-1,3,2-dioxaborolane;
2-(2-iodophenyl)-4,4,5,5-tetramethyl-1,3,2-dioxaborolane;
4-(4,4,5,5-tetramethyl-1,3,2-dioxaborolane-2-yl)benzonitrile;
4,4,5,5-tetramethyl-2-[3-(trifluoromethoxy)phenyl]-1,3,2-dioxaborolane;
2-(4,4,5,5-tetramethyl-1,3,2-dioxaborolane-2-yl)aniline;
2-[2-(trifluoromethyl)phenyl]-4,4,5,5-tetramethyl-1,3,2-dioxaborolane;
2-[3,5-bis(trifluoromethyl)phenyl]-4,4,5,5-tetramethyl-1,3,2-dioxaborolane; or
2-fluoro-5-(4,4,5,5-tetramethyl-1,3,2-dioxaborolane-2-yl)benzonitrile, preferably 4,4,5,5-tetramethyl-2-(3,4,5-trifluorophenyl)-1,3,2-dioxaborolane.

In one embodiment of the primary cell according to the present invention, it is provided that the boron compound is a compound according to formula (2), where each of R1 to R4 and R5 independentl from one another is a $C_1$ to $C_4$ alkyl.

In one embodiment of the primary cell according to the present invention, it is provided that the compound according to formula (2) is:

2-ethoxy-4,4,5,5-tetramethyl-1,3,2-dioxaborolane;
2-methoxy-4,4,5,5-tetramethyl-1,3,2-dioxaborolane; or
2-isopropoxy-4,4,5,5-tetramethyl-1,3,2-dioxaborolane.

In one embodiment of the primary cell according to the present invention, it is provided that the boron compound is a compound according to formula (3), where R1 is an alkyl, an alkenyl, in particular an allyl or an aryl, in particular a benzyl, phenyl, or benzoate, which is unsubstituted, or substituted with one or more $C_1$ to $C_4$ alkyl, —F, —Cl, —Br, —I, —CN, —$CF_3$ or —$OCF_3$ or a compound according to formula (3), and each of R2 and R3 independent is a $C_1$ to $C_4$ alkyl.

In one embodiment of the primary cell according to the present invention, it is provided that the compound according to formula (3) is:

2-allyl-5,5-dimethyl-1,3,2-dioxaborinane;
5,5-dimethyl-2-phenyl-1,3,2-dioxaborinane;
2,2'-(1,4-phenylene)bis[5,5-dimethyl-1,3,2-dioxaborinane];
2-(2-chlorophenyl)-5,5-dimethyl-1,3,2-dioxaborinane;
2-(1,3,2-dioxaborinane-2-yl)benzonitrile;
2-(2-fluorophenyl)-5,5-dimethyl-1,3,2-dioxaborinane;
2-(4-fluorophenyl)-5,5-dimethyl-1,3,2-dioxaborinane;
4,4'-bis(5,5-dimethyl-1,3,2-dioxaborinane-2-yl)biphenyl;
ethyl 2-(5,5-dimethyl-1,3,2-dioxaborinane-2-yl)benzoate;
2-(5,5-dimethyl-1,3,2-dioxaborinane-2-yl)-6-(trifluoromethyl)benzonitrile; or
4-(trifluoromethyl)-2-(5,5-dinethyl-1,3,2-dioxaborinane-2-yl)benzonitrile.

In one embodiment of the primary cell according to the present invention, it is provided that the boron compound is a compound according to formula (4), where each of R1, R2 and R3 independent from one another is a $C_1$ to $C_4$ alkyl.

In one embodiment of the primary cell according to the present invention, it is provided that the compound according to formula (4) is:

2-isopropoxy-4,4,6-trimethyl-1,3,2-dioxaborinane;
2-ethoxy-4,4,6-trimethyl-1,3,2-dioxaborinane; or
2-methoxy-4,4,6-trimethyl-1,3,2-dioxaborinane.

In one embodiment of the primary cell according to the present invention, it is provided that the boron compound is a compound according to formula (7), where each of R1 to R3 independent from one another is an alkyl, in particular a $C_1$ to $C_4$ alkyl, in particular methyl, or an aryl, in particular a phenyl, which is unsubstituted or substituted with one or more —F, —Cl, —Br, —I, —CN, —$CF_3$ or —$OCF_3$.

In one embodiment of the primary cell according to the present invention, it is provided that the compound according to formula (7) is:
trimethylboroxine;
2,4,6-triphenylboroxine,
2,4,6-tris(4-fluorophenyl)boroxine;
2,4,6-tris(3,4,5-trifluorophenyl)boroxine;
2,4,6-tris(3,4-difluorophenyl)boroxine; or
2,4,6-tris(3,4-dichlorophenyl)boroxine.

In one embodiment of the primary cell according to the present invention, it is provided that the boron compound is a compound according to formula (8), where each of R1 to R3 independent from one another is a $C_1$ to $C_4$ alkyl.

In one embodiment of the primary cell according to the present invention, it is provided that the compound according to formula (8) is 2,4,6-trimethoxyboroxine.

In one embodiment of the primary cell according to the present invention, it is provided that the boron compound is present in the electrolyte in a concentration in the range of 0.001 $mol*l^{-1}$ to 0.5 $mol*l^{-1}$.

In one embodiment of the primary cell according to the present invention, it is provided that the alkali metal, serving as the active electrode material, is lithium, and the primary cell is a lithium battery.

In one embodiment of the primary cell according to the present invention, it is provided that the electrolyte is a non-aqueous electrolyte.

In one embodiment of the primary cell according to the present invention, it is provided that the non-aqueous electrolyte:

- comprises a first solvent, which is selected from the group consisting of an ester, an ether, a dialkyl carbonate and a mixture thereof, in particular tetrahydrofuran, methyl acetate, diglyme (bis(2-methoxyethyl)ether), triglyme (tris(2-methoxyethyl)ether), tetraglyme (tetra(2-methoxyethyl)ether), 1,2-dimethoxyethane, 1,2-diethoxyethane, 1-ethoxy, 2-methoxyethane, dimethyl carbonate, diethyl carbonate, dipropyl carbonate, ethyl methyl carbonate, methyl propyl carbonate, ethyl propyl carbonate or a mixture thereof, and
- comprises a second solvent, which is selected from the group consisting of a cyclic carbonate, a cyclic ester, a cyclic amide and a mixture thereof, in particular propylene carbonate, ethylene carbonate, butylene carbonate, γ-butyrolactone, N-methylpyrrolidinone or a mixture thereof, or a polar non-aqueous solvent such as acetonitrile, dimethylsulfoxide, dimethylformamide, dimethylacetamide, or a mixture thereof.

In one embodiment of the primary cell according to the present invention, it is provided that the electrolyte comprises an anhydrous alkali salt, in particular an anhydrous lithium salt, preferably $LiClO_4$, $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CF_3$, $LiSO_3F$, $LiB(C_6H_5)_4$, $LiCF_3SO_3$ or a mixture thereof.

In one embodiment, the primary cell according to the present invention furthermore comprises a carbon monofluoride as the active electrode material, and particularly as the active cathode material. The carbon monofluoride may be present by itself or form hybrid cathodes with metal oxides, preferably of transition metals, for example $MnO_2$, SVO (silver oxide and vanadium pentoxide), copper silver vanadium oxide, cobalt oxide, nickel oxide, copper oxide, copper sulfide, iron sulfide, iron disulfide, titanium disulfide, or mixtures thereof.

In one embodiment, the primary cell according to the present invention comprises a cathode binder, in particular polytetrafluoroethylene, polyvinylidene fluoride (PVdF), polytetrafluoroethylene (PTFE), polyolefins, preferably thermoplastic elastomers, in particular ethylene propylene diene terpolymers, or mixtures thereof.

In one embodiment, the primary cell according to the present invention comprises carbon, in particular in the form of graphite, graphite powder or carbon black, or aluminum, in particular aluminum powder, titanium, in particular titanium powder, stainless steel, in particular stainless steel powder, or mixtures thereof, as a conducting additive.

According to claim 9, a boron compound is provided for use as an electrolyte additive of a primary cell comprising an alkali metal as the active electrode material, in particular an organic boron compound.

According to the present invention, it is particularly provided that the boron compound is a compound according to formula (1), (2), (3), (4), (7) or (8):

(1)

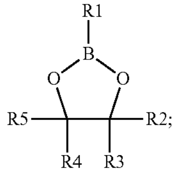

(2)

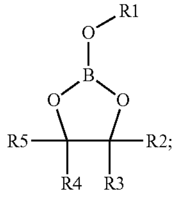

(3)

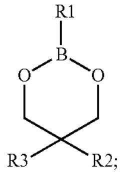

(4)

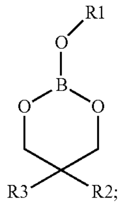

(7)

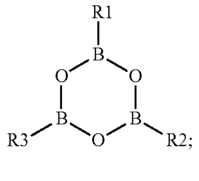

-continued

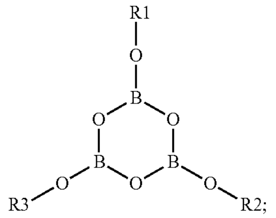

(8)

where each of R1, R2, R3, R4 and R5 independent from one another is selected from the group consisting of hydrogen, alkyl, alkenyl, cycloalkyl, thioether, heterocyclic compounds, aryl and heteroaryl, wherein R1, R2, R3, R4 or R5 is not thiophene.

In one embodiment of the use according to the present invention, it is provided that each of R1, R2, R3, R4 and R5 independent from one another is unsubstituted or is mono-substituted or multiple substituted with at least one substituent selected from the group consisting of: alkyl, fluoroalkyl, alkoxy, carbonyl, carboxyl, thiol, thio alkoxide, aryl, ether, thioether, nitro, cyano, amino, azido, amidino, hydrazino, hydrazono, carbamoyl, sulfo, sulfamoyl, sulfonylamino, alkylaminosulfate, alkylsulfonylamino and/or halogens, wherein R1, R2, R3, R4 or R5 is not thiophene.

In one embodiment of the use according to the present invention, it is provided that the boron compound is a compound according to formula (1), where R1 is an alkyl, in particular a $C_1$ to $C_6$ alkyl, in particular methyl, cyclopropyl or cyclohexyl, or an aryl, in particular a phenyl, a benzyl or a naphthyl, which is unsubstituted or substituted with one or more $C_1$ to $C_4$ alkyl, —F, —Cl, —Br, —I, —CN, —$CF_3$ or —$OCF_3$, and each of R2 to R4 and R5 independent from one another is a $C_1$ $C_4$ alkyl.

In one embodiment of the use according to the present invention, it is provided that the is compound according to formula (1) is:

4,4,5,5-tetramethyl-2-(3,4,5-trifluorophenyl)-1,3,2-dioxaborolane;
2-(bromomethyl)-4,4,5,5-tetramethyl-1,3,2-dioxaborolane;
2-cyclopropyl-4,4,5,5-tetramethyl-1,3,2-dioxaborolane;
2-cyclohexyl-4,4,5,5-tetramethyl-1,3,2-dioxaborolane;
4,4,5,5-tetramethyl-2-(naphthalene-1-ylmethyl)-1,3,2-dioxaborolane;
2-benzyl-4,4,5,5-tetramethyl-1,3,2-dioxaborolane;
2-phenyl-4,4,5,5-tetramethyl-1,3,2-dioxaborolane;
4,4,5,5-tetramethyl-2-(1-naphthyl)-1,3,2-dioxaborolane;
2-(4-chlorophenyl)-4,4,5,5-tetramethyl-1,3,2-dioxaborolane;
2-(4-fluorophenyl)-4,4,5,5-tetramethyl-1,3,2-dioxaborolane;
4,4,5,5-tetramethyl-2-(3,4,5-trifluorophenyl)-1,3,2-dioxaborolane;
2-(4-bromophenyl)-4,4,5,5-tetramethyl-1,3,2-dioxaborolane;
2-(3,5-dichlorophenyl)-4,4,5,5-tetramethyl-1,3,2-dioxaborolane;
2-(2-iodophenyl)-4,4,5,5-tetramethyl-1,3,2-dioxaborolane;
4-(4,4,5,5-tetramethyl-1,3,2-dioxaborolane-2-yl)benzonitrile;
4,4,5,5-tetramethyl-2-[3-(trifluoromethoxy)phenyl]-1,3,2-dioxaborolane;
2-(4,4,5,5-tetramethyl-1,3,2-dioxaborolane-2-yl)aniline;
2-[2-(trifluoromethyl)phenyl]-4,4,5,5-tetramethyl-1,3,2-dioxaborolane;
2-[3,5-bis(trifluoromethyl)phenyl]-4,4,5,5-tetramethyl-1,3,2-dioxaborolane; or
2-fluoro-5-(4,4,5,5-tetramethyl-1,3,2-dioxaborolane-2-yl)benzonitrile, preferably 4,4,5,5-tetramethyl-2-(3,4,5-trifluorophenyl)-1,3,2-dioxaborolane.

In one embodiment of the use according to the present invention, it is provided that the boron compound is a compound according to formula (2), where each of R1 to R4 and R5 independent from one another is a $C_1$ to $C_4$ alkyl.

In one embodiment of the use according to the present invention, it is provided that the compound according to formula (2) is:

2-ethoxy-4,4,5,5-tetramethyl-1,3,2-dioxaborolane;
2-methoxy-4,4,5,5-tetramethyl-1,3,2-dioxaborolane; or
2-isopropoxy-4,4,5,5-tetramethyl-1,3,2-dioxaborolane.

In one embodiment of the use according to the present invention, it is provided that the boron compound is a compound according to formula (3), where R1 is an alkyl, an alkenyl, in particular an allyl or an aryl, in particular a benzyl, phenyl, or benzoate, which is unsubstituted, or substituted with one or more $C_1$ to $C_4$ alkyl, —F, —Cl, —Br, —I, —CN, —$CF_3$ or —$OCF_3$, and each of R2 and R3 independent from one another is a $C_1$ to $C_4$ alkyl.

In one embodiment of the use according to the present invention, it is provided that the compound according to formula (3) is:

2-allyl-5,5-dimethyl-1,3,2-dioxaborinane;
5,5-dimethyl-2-phenyl-1,3,2-dioxaborinane;
2,2'-(1,4-phenylene)bis[5,5-dimethyl-1,3,2-dioxaborinane];
2-(2-chlorophenyl)-5,5-dimethyl-1,3,2-dioxaborinane;
2-(1,3,2-dioxaborinane-2-yl)benzonitrile;
2-(2-fluorophenyl)-5,5-dimethyl-1,3,2-dioxaborinane;
2-(4-fluorophenyl)-5,5-dimethyl-1,3,2-dioxaborinane;
4,4'-bis(5,5-dimethyl-1,3,2-dioxaborinane-2-yl)biphenyl;
ethyl 2-(5,5-dimethyl-1,3,2-dioxaborinane-2-yl)benzoate;
2-(5,5-dimethyl-1,3,2-dioxaborinane-2-yl)-6-(trifluoromethyl)benzonitrile; or
4-(trifluoromethyl)-2-(5,5-dinethyl-1,3,2-dioxaborinane-2-yl)benzonitrile.

In one embodiment of the use according to the present invention, it is provided that the boron compound is a compound according to formula (4), where each of R1, R2 and R3 independent from one another is a $C_1$ to $C_4$ alkyl.

In one embodiment of the use according to the present invention, it is provided that the compound according to formula (4) is:

2-isopropoxy-4,4,6-trimethyl-1,3,2-dioxaborinane;
2-ethoxy-4,4,6-trimethyl-1,3,2-dioxaborinane; or
2-methoxy-4,4,6-trimethyl-1,3,2-dioxaborinane.

In one embodiment of the use according to the present invention, it is provided that the boron compound is a compound according to formula (7), where each of R1 to R3 independent from one another is an alkyl, in particular a $C_1$ to $C_4$ alkyl, in particular methyl, or an aryl, in particular a phenyl, which is unsubstituted or substituted with one or more —F, —Cl, —Br, —I, —CN, —CF R3 —$OCF_3$.

In one embodiment of the use according to the present invention, it is provided that the compound according to formula (7) is:

trimethylboroxine;
2,4,6-triphenylboroxine,
2,4,6-tris(4-fluorophenyl)boroxine;
2,4,6-tris(3,4,5-trifluorophenyl)boroxine;
2,4,6-tris(3,4-difluorophenyl)boroxine; or
2,4,6-tris(3,4-dichlorophenyl)boroxine.

In one embodiment of the use according to the present invention, it is provided that the boron compound is a compound according to formula (8), where each of R1 to R3 independent from one another is a $C_1$ to $C_4$ alkyl.

In one embodiment of the use according to the present invention, it is provided that the compound according to formula (8) is 2,4,6-trimethoxyboroxine.

In one embodiment of the use according to the present invention, it is provided that the alkali metal, serving as the active electrode material, is lithium, and the primary cell is a lithium battery.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

Further features and advantages of the present invention are described hereafter based on the description of the figures of exemplary embodiments. In the drawings.

DETAILED DESCRIPTION

Figure 1:
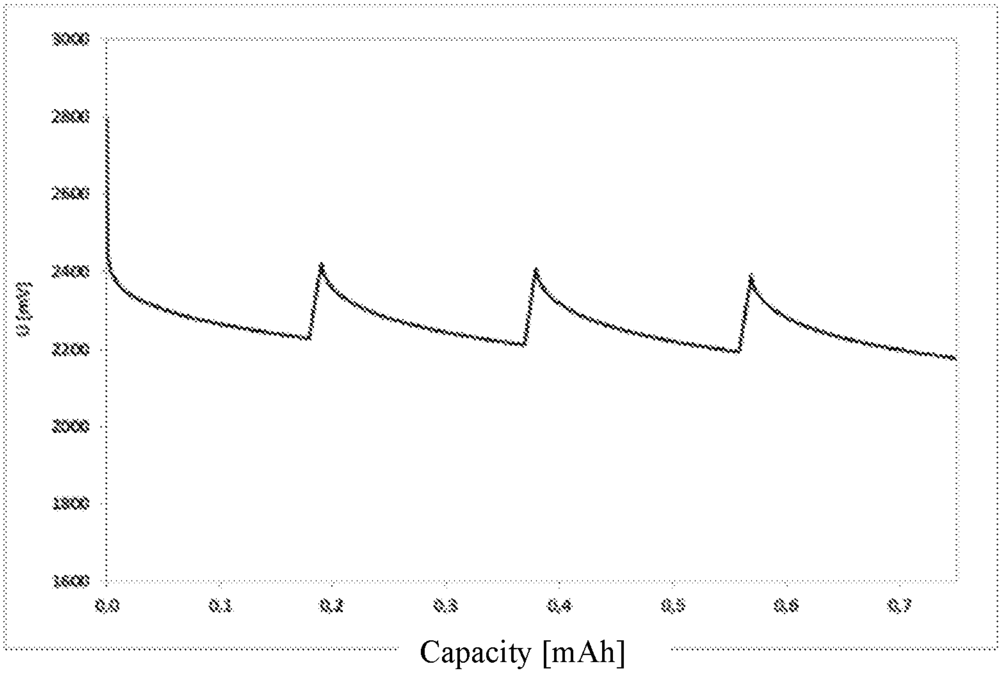
FIG. 1 shows the pulse curve of an electrochemical cell without voltage delay.
Figure 2:
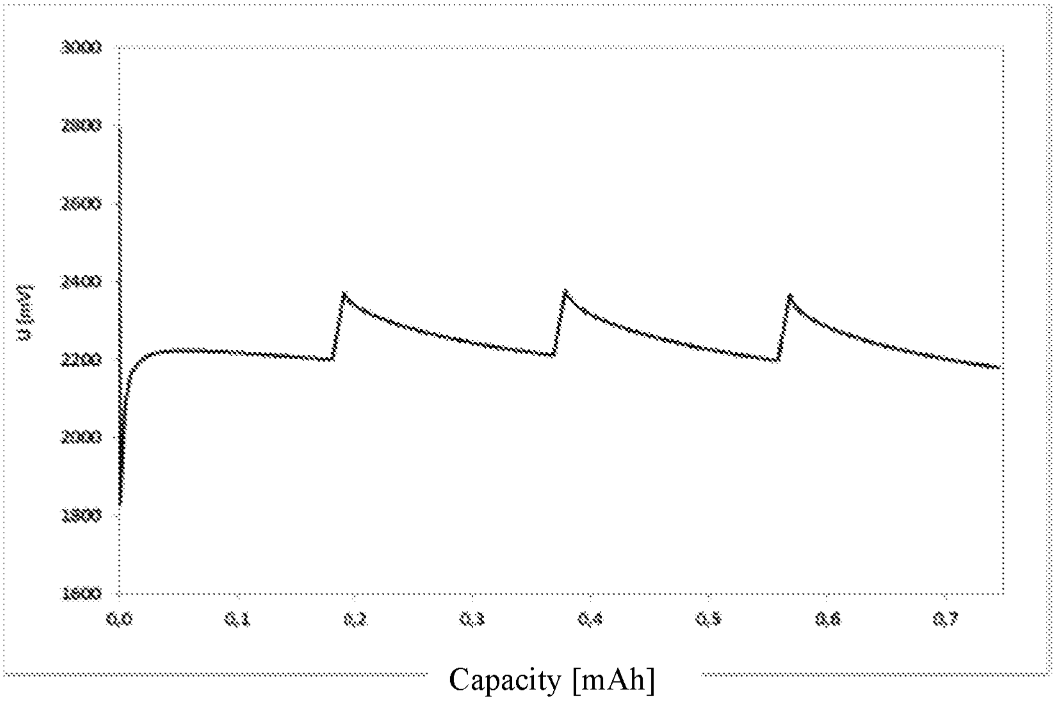
FIG. 2 shows the pulse curve of an electrochemical cell with voltage delay.

Lithium carbon monofluoride cells (Li/CFx) have the highest theoretical specific capacity compared to commercial lithium primary batteries. The overall equation of the discharge is as follows:

$$CF_x + xLi \rightarrow C + xLiF$$

LiF is an anionic and electrical insulator, which, on the one hand, adheres to the surface of the cathode pores and, on the other hand, partially dissolves in the electrolyte. At a depth of discharge between the MOL and EOL states, the fluoride concentration in the electrolyte increases, resulting in a high impedance cover layer of lithium fluoride compounds on the anode surface (Table 1). Under certain pulse discharge conditions, this can result in voltage is delay or in non-monotonic behavior.

TABLE 1

Fluoride content on lithium anode surface at different depths of discharge.

| Cell no. | DoD [%] | Fluoride [μg] |
|---|---|---|
| Cell 1 | 50 | 2.05 |
| Cell 2 | 50 | 1.95 |
| Cell 3 | 50 | 2.15 |
| Cell 4 | 80 | 4.40 |
| Cell 5 | 80 | 3.90 |
| Cell 6 | 80 | 4.15 |
| Cell 7 | 90 | 23.45 |
| Cell 8 | 90 | 21.00 |
| Cell 9 | 90 | 24.65 |
| Cell 10 | 95 | 63.10 |
| Cell 11 | 95 | 69.75 |
| Cell 12 | 95 | 66.60 |

The present invention relates, in general, to an electrochemical alkali metal cell and in particular to a lithium/carbon monofluoride or a lithium/carbon monofluoride metal oxide cell, which are suitable for uses with current pulse discharge and without voltage delay. More precisely, the present invention relates to an electrochemical lithium metal cell comprising a non-aqueous electrolyte, which prevents voltage delay due to an electrolyte additive.

The present invention relates in particular to dioxaborolane, diboron and boroxine electrolyte additives for alkali metal electrochemical cells comprising carbon monofluoride (CFx) or CFx transition metal oxide hybrid cathodes (such as Li/CFx-MnO2, Li/CFx-SVO, etc.) as the cathode active material. The LiCFx system shows voltage delay under pulse conditions prior to the end-of-life (EOL) state. To suppress the voltage delay and reduce the increase in impedance, according to the present invention in particular dioxaborolane, diboron and boroxine additives are added to the electrolyte.

The advantage of the present invention is the formation of a solid electrolyte interface (SEI) film on the negative electrode (for example a lithium metal), which protects the electrode surface, that is, the electrolyte additive on the anode surface is reduced, protecting the same against the formation of a high impedance cover layer, which, in turn, improves the stabilization of the internal resistance of the battery, improves the discharge power, and eliminates the voltage delay (Table 2).

TABLE 2

Boron content on lithium anode surface at EOL state.

| Cell no. | Boron [μg] |
|---|---|
| Cell 13 | 11.75 |
| Cell 14 | 10.42 |

The present invention preferably relates to the above-described electrochemical alkali metal cell comprising non-aqueous, ionically conductive electrolytes and at least one compound according to general formula (1), (2), (3), (4), (5), (6), (7) and (8).

The electrochemical cell for the execution and comparison examples were produced from the following components:

| | Example 1 | Example 2 | Example 3 |
|---|---|---|---|
| Electrolyte additive | LiBOB | TMTFPDDB | TMB |
| Cathode active material: | | CFx | |
| Conducting additives (percentage by weight, %) | | Graphite (3%) and carbon black (2%) | |
| Cathode binder (percentage by weight, %) | | Polytetrafluoroethylene (3%) | |
| Electrolyte | | 1M LiClO4 in 1,2-dimethoxyethane, ethylene carbonate and propylene carbonate (4:4:2) | |
| Anode | | Lithium | |

Example 1 (Comparison Example)

Figure 3:
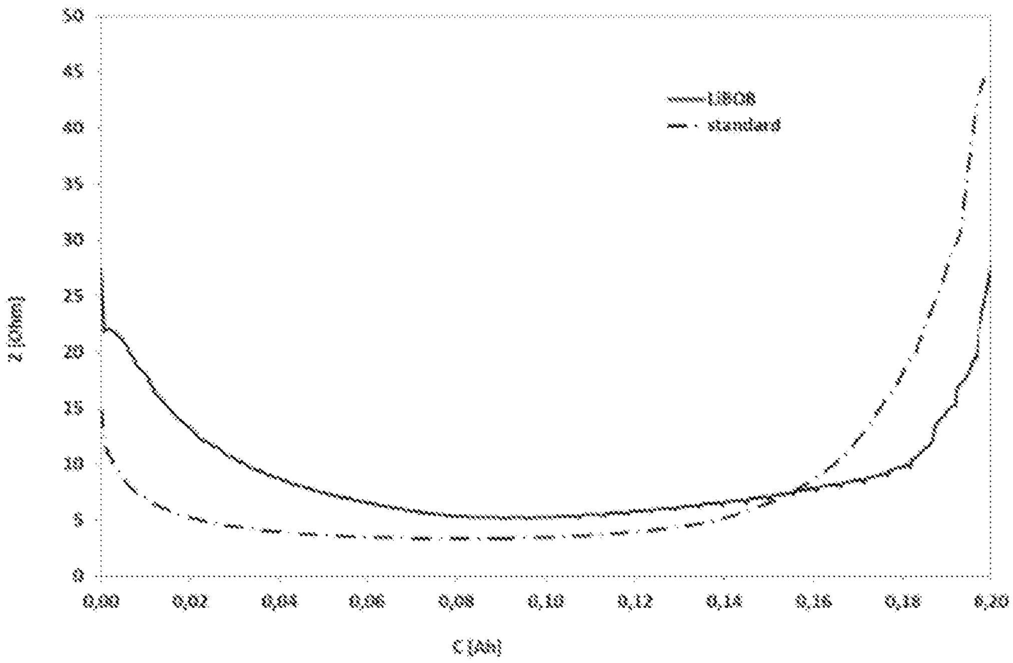
FIG. 3 shows the impedance curve of a battery comprising an electrolyte additive known from the prior art (lithium bis(oxalato)borate (LiBOB))

FIG. 3 shows the impedance curves of the discharge with 12.7 KOhm and daily pulse loading of 10 mA/156 s, wherein the measurement was carried out in each case with a standard electrolyte (without electrolyte additive) and a standard electrolyte containing 0.075 M lithium bis(oxalato) borate (LiBOB) as the additive. As mentioned at the outset, LiBOB is an electrolyte additive known from the prior art. It is clearly apparent that an increase in the internal resistance of the battery occurs with increasing discharge.

Example 2

Figure 4:
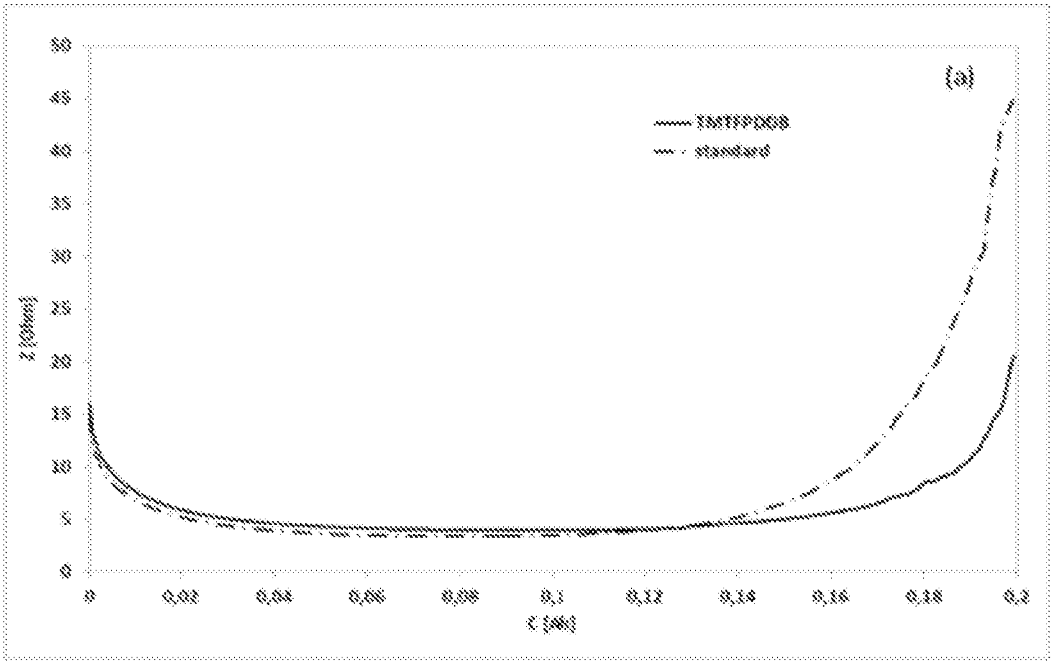
FIG. 4 shows an impedance curve (a), and a pulse discharge and pulse curve at 180 mAh depth of discharge (B) of a battery comprising an electrolyte additive according to the present invention (4,4,5,5-tetramethyl-2-(3,4,5-trifluorophenyl)-1,3,2-dioxaborolane (TMTFPDDB)
Figure 4:
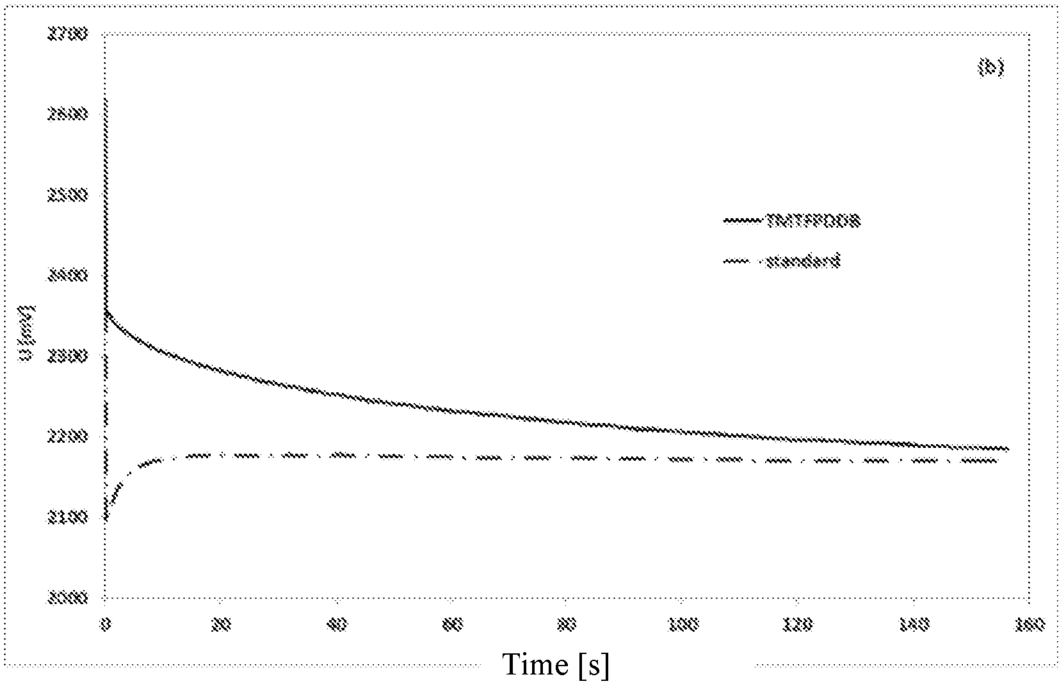

FIG. 4 illustrates the discharge data with 12.7 KOhm and daily pulse loading of 10 mA/156 s, wherein the impedance curve of the battery during the discharge is shown in (a) and the pulse curve at 180 mAh is shown in (b). A standard electrolyte and the standard electrolyte containing 0.075 M of an electrolyte additive according to the present invention, which in this case is 4,4,5,5-tetramethyl-2-(3,4,5-trifluorophenyl)-1,3,2-dioxaborolane (TMTFPDDB), were used. It is clearly apparent that the internal resistance of the battery does not increase across wide discharge ranges due to the electrolyte additive according to the present invention.

Example 3

Figure 5:
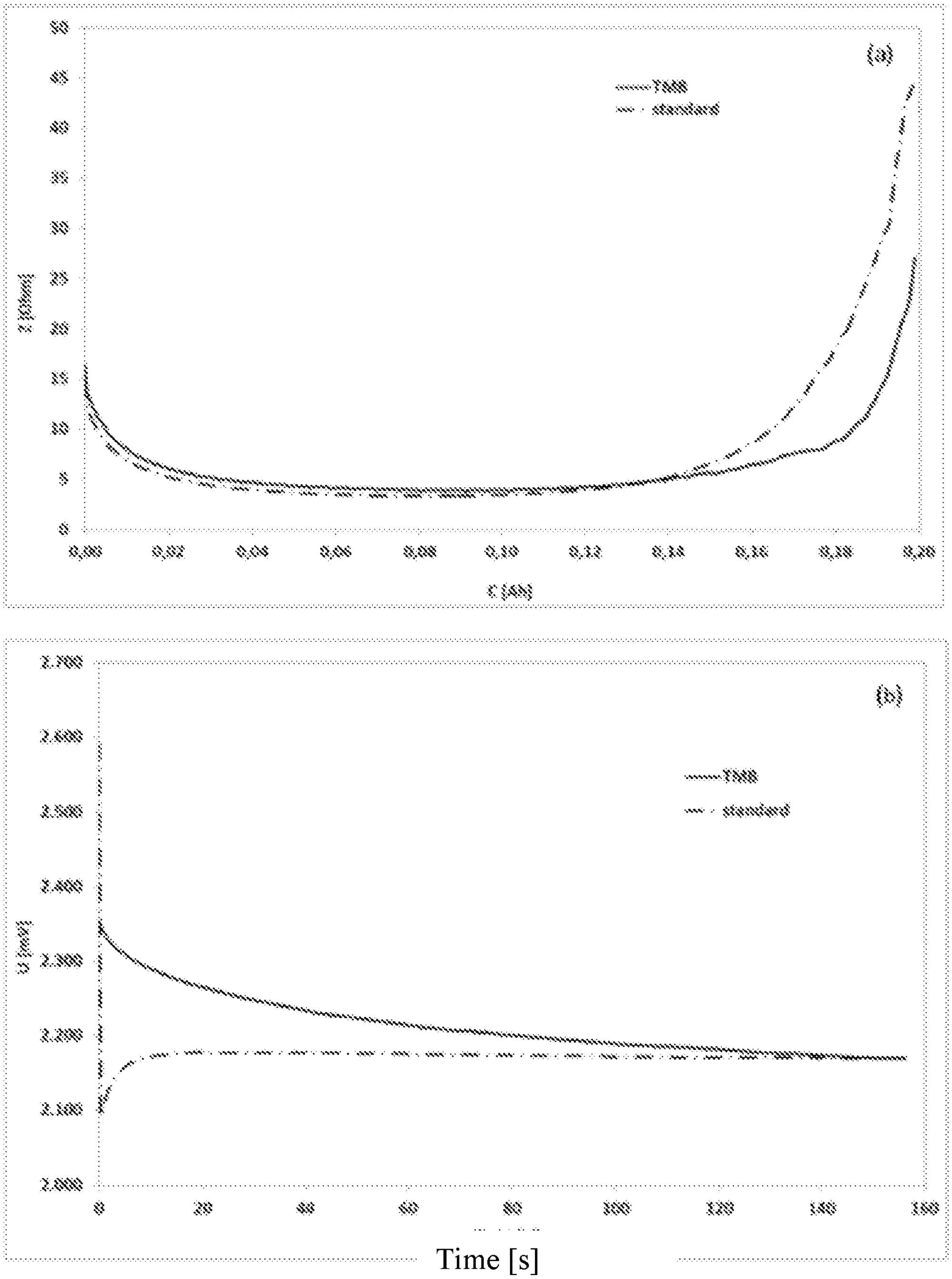
FIG. 5 shows an impedance curve (a), and a pulse discharge and pulse curve at 180 mAh depth of discharge (B) of a battery comprising a further electrolyte additive according to the present invention (trimethylboroxine (TMB)).

FIG. 5 illustrates the discharge data with 12.7 KOhm and daily pulse loading of 10 mA/156 s, wherein the impedance curve of the battery during the discharge is shown in (a) and the pulse curve at 180 mAh is shown in (b). A standard electrolyte and the standard electrolyte containing 0.075 M of an electrolyte additive according to the present invention, which in this case is trimethylboroxine (TMB), were used. It is also clearly apparent here that the internal resistance of the battery does not increase across wide discharge ranges due to the electrolyte additive according to the present invention.

In summary, it was shown that, in particular through the use of dioxaborolane, diboron and boroxine additives, voltage delay can be eliminated, and the battery impedance can be reduced.

In implantable batteries for cardiac therapies, batteries that showed voltage delays used only a portion of the total capacity (until voltage delay appeared). As a result of the dioxaborolane, diboron and boroxine electrolyte additives, the overall discharge capacity of the implantable batteries can be rendered usable.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. A lithium primary cell battery, comprising:

a lithium metal as an active anode material, and a carbon monofluoride as an active cathode material, an electrolyte comprising a boron compound, wherein the primary cell is a non-rechargeable cell and configured to operate at open circuit voltages no greater than 3.4 volts;

wherein the boron compound is a compound according to formula (1), (2), (3), (4), (7) or (8):

(1)

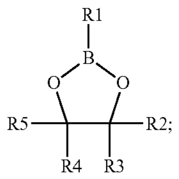

(2)

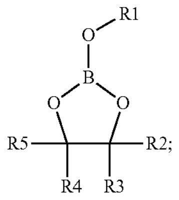

(3)

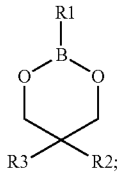

(4)

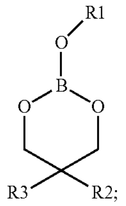

(7)

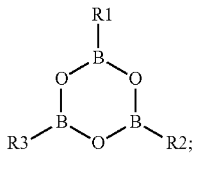

-continued

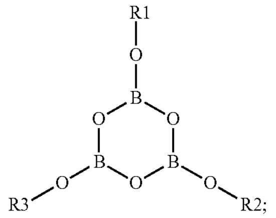

(8)

wherein each of R1, R2, R3, R4 and R5 independent from one another is selected from the group consisting of hydrogen, alkyl, alkenyl, cycloalkyl, thioether, heterocyclic compounds, aryl and heteroaryl, wherein R1, R2, R3, R4 or R5 is not thiophene.

2. The lithium primary cell battery according to claim 1, wherein each of R1, R2, R3, R4 and R5 independent from one another is unsubstituted or is monosubstituted or multiple substituted with at least one substituent selected from the group consisting of: alkyl, fluoroalkyl, alkoxy, carbonyl, carboxyl, thiol, thio alkoxide, aryl, ether, thioether, excluding thiophene, nitro, cyano, amino, azido, amidino, hydrazino, hydrazono, carbamoyl, sulfo, sulfamoyl, sulfonylamino, alkylaminosulfonyl, alkylsulfonylamino and/or halogens, wherein R1, R2, R3, R4 or R5 is not thiophene.

3. The lithium primary cell battery according to claim 1, wherein the boron compound is:

- a compound according to formula (1), where R1 is an alkyl, and each of R2 to R5 independent from one another is a $C_1$ $C_4$ alkyl;
- a compound according to formula (2), where each of R1 to R5 independent from one another is a $C_1$ to $C_4$ alkyl;
- a compound according to formula (3), where R1 is an alkyl or an alkenyl, and each of R2 and R3 independent from one another is a $C_1$ to $C_4$ alkyl;
- a compound according to formula (4), where each of R1, R2 and R3, independent from one another is a $C_1$ to $C_4$ alkyl; or
- a compound according to formula (8), where each of R1 to R3 independent from one another is a $C_1$ to $C_4$ alkyl.

4. The lithium primary cell battery according to claim 1, wherein the boron compound is:

4,4,5,5-tetramethyl-2-(3,4,5-trifluorophenyl)-1,3,2-dioxaborolane;
2-(bromomethyl)-4,4,5,5-tetramethyl-1,3,2-dioxaborolane;
2-cyclopropyl-4,4,5,5-tetramethyl-1,3,2-dioxaborolane;
2-cyclohexyl-4,4,5,5-tetramethyl-1,3,2-dioxaborolane;
4,4,5,5-tetramethyl-2-(naphthalene-1-ylmethyl)-1,3,2-dioxaborolane;
2-benzyl-4,4,5,5-tetramethyl-1,3,2-dioxaborolane;
2-phenyl-4,4,5,5-tetramethyl-1,3,2-dioxaborolane;
4,4,5,5-tetramethyl-2-(1-naphthyl)-1,3,2-dioxaborolane;
2-(4-chlorophenyl)-4,4,5,5-tetramethyl-1,3,2-dioxaborolane;
2-(4-fluorophenyl)-4,4,5,5-tetramethyl-1,3,2-dioxaborolane;
4,4,5,5-tetramethyl-2-(3,4,5-trifluorophenyl)-1,3,2-dioxaborolane;
2-(4-bromophenyl)-4,4,5,5-tetramethyl-1,3,2-dioxaborolane;
2-(3,5-dichlorophenyl)-4,4,5,5-tetramethyl-1,3,2-dioxaborolane;
2-(2-iodophenyl)-4,4,5,5-tetramethyl-1,3,2-dioxaborolane;
4-(4,4,5,5-tetramethyl-1,3,2-dioxaborolane-2-yl)benzonitrile;
4,4,5,5-tetramethyl-2-[3-(trifluoromethoxy)phenyl]-1,3,2-dioxaborolane;
2-(4,4,5,5-tetramethyl-1,3,2-dioxaborolane-2-yl)aniline;
2-[2-(trifluoromethyl)phenyl]-4,4,5,5-tetramethyl-1,3,2-dioxaborolane;
2-[3,5-bis(trifluoromethyl)phenyl]-4,4,5,5-tetramethyl-1,3,2-dioxaborolane;
2-fluoro-5-(4,4,5,5-tetramethyl-1,3,2-dioxaborolane-2-yl)benzonitrile;
2-ethoxy-4,4,5,5-tetramethyl-1,3,2-dioxaborolane;
2-methoxy-4,4,5,5-tetramethyl-1,3,2-dioxaborolane;
2-isopropoxy-4,4,5,5-tetramethyl-1,3,2-dioxaborolane
2-allyl-5,5-dimethyl-1,3,2-dioxaborinane;
5,5-dimethyl-2-phenyl-1,3,2-dioxaborinane;
2,2'-(1,4-phenylene)bis[5,5-dimethyl-1,3,2-dioxaborinane];
2-(2-chlorophenyl)-5,5-dimethyl-1,3,2-dioxaborinane;
2-(1,3,2-dioxaborinane-2-yl)benzonitrile;
2-(2-fluorophenyl)-5,5-dimethyl-1,3,2-dioxaborinane;
2-(4-fluorophenyl)-5,5-dimethyl-1,3,2-dioxaborinane;
4,4'-bis(5,5-dimethyl-1,3,2-dioxaborinane-2-yl)biphenyl;
ethyl 2-(5,5-dimethyl-1,3,2-dioxaborinane-2-yl)benzoate;
2-(5,5-dimethyl-1,3,2-dioxaborinane-2-yl)-6-(trifluoromethyl)benzonitrile;
4-(trifluoromethyl)-2-(5,5-dinethyl-1,3,2-dioxaborinane-2-yl)benzonitrile;
2-isopropoxy-4,4,6-trimethyl-1,3,2-dioxaborinane;
2-ethoxy-4,4,6-trimethyl-1,3,2-dioxaborinane;
2-methoxy-4,4,6-trimethyl-1,3,2-dioxaborinane;
trimethylboroxine;
2,4,6-triphenylboroxine;
2,4,6-tris(4-fluorophenyl)boroxine;
2,4,6-tris(3,4,5-trifluorophenyl)boroxine;
2,4,6-tris(3.4-fluorophenyl)boroxine;
2,4,6-tris(3,4-dichlorophenyl)boroxine; or
2,4,6-trimethoxyboroxine.

5. The lithium primary cell battery according to claim 1, wherein the boron compound is present in the electrolyte in a concentration in the range of 0.001 $mol*l^{-1}$ to 0.5 $mol*l^{-1}$.

6. The lithium primary cell battery according to claim 1, wherein the electrolyte is a non-aqueous electrolyte.

7. The lithium primary cell battery according to claim 6, wherein the non-aqueous electrolyte:

- comprises a first solvent, which is selected from the group consisting of an ester, an ether, a dialkyl carbonate and a mixture thereof, and
- comprises a second solvent, which is selected from the group consisting of a cyclic carbonate, a cyclic ester, a cyclic amide and a mixture thereof.

8. The lithium primary cell battery according to claim 1, wherein the electrolyte comprises an anhydrous alkali salt comprising $LiClO_4$, $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CF_3$, $LiSO_3F$, $LiB(C_6H_5)_4$, $LiCF_3SO_3$ or mixtures thereof.

9. Use of a boron compound as the electrolyte additive of a lithium primary cell battery comprising lithium metal as an active anode material, a carbon monofluoride as an active cathode material, and an electrolyte comprising the boron compound, wherein the lithium primary cell battery is a non-rechargeable cell and is configured to operate at open circuit voltages no greater than 3.4 volts, wherein the boron compound is a compound according to formula (1), (2), (3), (4), (7) or (8):

(1)

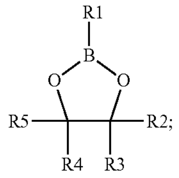

(2)

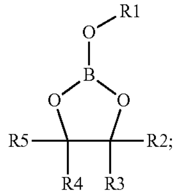

(3)

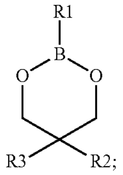

(4)

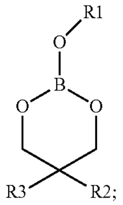

(7)

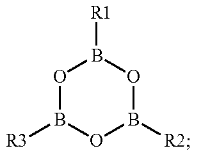

(8)

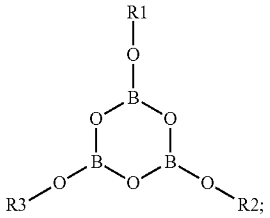

wherein each of R1, R2, R3, R4 and R5 independent from one another is selected from the group consisting of hydrogen, alkyl, alkene, cycloalkyl, thioether, heterocyclic compounds, aryl and heteroaryl, wherein R1, R2, R3, R4 or R5 is not thiophene.

10. Use of a boron compound as an electrolyte additive of the lithium primary cell battery according to claim 9, wherein each of R1, R2, R3, R4 and R5 independent from one another is unsubstituted or is monosubstituted or multiple substituted with at least one substituent selected from the group consisting of: alkyl, fluoroalkyl, alkoxy, carbonyl, carboxyl, thiol, thio alkoxide, aromatic compound, ether, thioether, nitro, cyano, amino, azido, amidino, hydrazino, hydrazono, carbamoyl, sulfo, sulfamoyl, sulfonylamino, alkylaminosulfonyl, alkylsulfonylamino and/or halogens, wherein R1, R2, R3, R4 or R5 is not thiophene.

11. Use of a boron compound as an electrolyte additive of the lithium primary cell battery according to claim 9, wherein the boron compound is:

a compound according to formula (1), where R1 is an alkyl, particularly a $C_1$ to $C_6$ alkyl, particularly methyl, cyclopropyl or cyclohexyl, or an aryl, particularly a phenyl, a benzyl or a naphthyl, which is unsubstituted or substituted with one or more $C_1$ to $C_4$ alkyl, —F, —Cl, —Br, —I, —CN, —$CF_3$ or —$OCF_3$, and each of R2 to R5 independent from one another is a $C_1$ $C_4$ alkyl;

a compound according to formula (2), where each of R1 to R5 independent from one another is a $C_1$ to $C_4$ alkyl;

a compound according to formula (3), where R1 is an alkyl, an alkenyl, and each of R2 and R3 independent from one another is a $C_1$ to $C_4$ alkyl;

a compound according to formula (4), where each of R1, R2 and R3 independent from one another is a $C_1$ to $C_4$ alkyl; or a compound according to formula (8), where each of R1 to R3 independent from one another is a $C_1$ to $C_4$ alkyl.

12. Use of a boron compound as an electrolyte additive of a lithium primary cell battery according to claim 11, wherein the boron compound is:

4,4,5,5-tetramethyl-2-(3,4,5-trifluorophenyl)-1,3,2-dioxaborolane;

2-(bromomethyl)-4,4,5,5-tetramethyl-1,3,2-dioxaborolane;

2-cyclopropyl-4,4,5,5-tetramethyl-1,3,2-dioxaborolane;

2-cyclohexyl-4,4,5,5-tetramethyl-1,3,2-dioxaborolane;

4,4,5,5-tetramethyl-2-(naphthalene-1-ylmethyl)-1,3,2-dioxaborolane;

2-benzyl-4,4,5,5-tetramethyl-1,3,2-dioxaborolane;

2-phenyl-4,4,5,5-tetramethyl-1,3,2-dioxaborolane;

4,4,5,5-tetramethyl-2-(1-naphthyl)-1,3,2-dioxaborolane;

2-(4-chlorophenyl)-4,4,5,5-tetramethyl-1,3,2-dioxaborolane;

2-(4-fluorophenyl)-4,4,5,5-tetramethyl-1,3,2-dioxaborolane;

4,4,5,5-tetramethyl-2-(3,4,5-trifluorophenyl)-1,3,2-dioxaborolane;

2-(4-bromophenyl)-4,4,5,5-tetramethyl-1,3,2-dioxaborolane;

2-(3,5-dichlorophenyl)-4,4,5,5-tetramethyl-1,3,2-dioxaborolane;

2-(2-iodophenyl)-4,4,5,5-tetramethyl-1,3,2-dioxaborolane;

4-(4,4,5,5-tetramethyl-1,3,2-dioxaborolane-2-yl)benzonitrile;

4,4,5,5-tetramethyl-2-[3-(trifluoromethoxy)phenyl]-1,3,2-dioxaborolane;

2-(4,4,5,5-tetramethyl-1,3,2-dioxaborolane-2-yl)aniline;

2-[2-(trifluoromethyl)phenyl]-4,4,5,5-tetramethyl-1,3,2-dioxaborolane;

2-[3,5-bis(trifluoromethyl)phenyl]-4,4,5,5-tetramethyl-1,3,2-dioxaborolane;

2-fluoro-5-(4,4,5,5-tetramethyl-1,3,2-dioxaborolane-2-yl)benzonitrile;

2-ethoxy-4,4,5,5-tetramethyl-1,3,2-dioxaborolane;

2-methoxy-4,4,5,5-tetramethyl-1,3,2-dioxaborolane;

2-isopropoxy-4,4,5,5-tetramethyl-1,3,2-dioxaborolane;

2-allyl-5,5-dimethyl-1,3,2-dioxaborinane;

5,5-dimethyl-2-phenyl-1,3,2-dioxaborinane;

2,2'-(1,4-phenylene)bis[5,5-dimethyl-1,3,2-dioxaborinane];

2-(2-chlorophenyl)-5,5-dimethyl-1,3,2-dioxaborinane;
2-(1,3,2-dioxaborinane-2-yl)benzonitrile;
2-(2-fluorophenyl)-5,5-dimethyl-1,3,2-dioxaborinane;
2-(4-fluorophenyl)-5,5-dimethyl-1,3,2-dioxaborinane;
4,4'-bis(5,5-dimethyl-1,3,2-dioxaborinane-2-yl)biphenyl;
ethyl 2-(5,5-dimethyl-1,3,2-dioxaborinane-2-yl)benzoate;
2-(5,5-dimethyl-1,3,2-dioxaborinane-2-yl)-6-(trifluoromethyl)benzonitrile;
4-(trifluoromethyl)-2-(5,5-dinethyl-1,3,2-dioxaborinane-2-yl)benzonitrile;
2-isopropoxy-4,4,6-trimethyl-1,3,2-dioxaborinane;
2-ethoxy-4,4,6-trimethyl-1,3,2-dioxaborinane;
2-methoxy-4,4,6-trimethyl-1,3,2-dioxaborinane;
trimethylboroxine;
2,4,6-triphenylboroxine;
2,4,6-tris(4-fluorophenyl)boroxine;
2,4,6-tris(3,4,5-trifluorophenyl)boroxine;
2,4,6-tris(3.4-fluorophenyl)boroxine;
2,4,6-tris(3,4-dichlorophenyl)boroxine; or
2,4,6-trimethoxyboroxine.

* * * * *